United States Patent
Sabac et al.

(10) Patent No.: US 7,775,003 B2
(45) Date of Patent: Aug. 17, 2010

(54) APPARATUS FOR SECURING AN IMPACT RESISTANT WINDOW TO A WINDOW FRAME

(76) Inventors: Steven R. Sabac, 4541 White Feather Trail, Boynton Beach, FL (US) 33436; Jason J. Kromolicki, 6834 Windwillow Dr., New Port Richey, FL (US) 34655

( * ) Notice: Subject to any disclaimer, the term of this patent is extended or adjusted under 35 U.S.C. 154(b) by 1267 days.

(21) Appl. No.: 11/049,441

(22) Filed: Feb. 2, 2005

(65) Prior Publication Data
US 2005/0129395 A1    Jun. 16, 2005

Related U.S. Application Data

(63) Continuation-in-part of application No. 09/457,631, filed on Dec. 8, 1999, now Pat. No. 6,912,631.

(51) Int. Cl.
E06B 3/30 (2006.01)
E06B 3/964 (2006.01)
E04C 2/38 (2006.01)

(52) U.S. Cl. .............. 52/204.62; 52/717.01; 52/204.53

(58) Field of Classification Search .............. 52/204.53, 52/204.54, 214, 211, 212, 204.62, 204.69, 52/204.705, 204.71, 204.7, 656.5, 717.01
See application file for complete search history.

(56) References Cited

U.S. PATENT DOCUMENTS

| | | | |
|---|---|---|---|
| 1,964,557 A | * | 6/1934 | Brezinski ............... 52/204.705 |
| 3,399,504 A | * | 9/1968 | Smith ................... 52/204.705 |
| 3,872,638 A | * | 3/1975 | Di Fazio ...................... 52/476 |
| 4,075,802 A | | 2/1978 | Gross et al. |
| 4,121,394 A | | 10/1978 | Brooks |
| RE30,930 E | * | 5/1982 | Trachtenburg et al. ..... 52/309.3 |
| 4,706,427 A | * | 11/1987 | Zeilinger .................. 52/287.1 |
| 4,829,730 A | * | 5/1989 | Zeilinger .................. 52/287.1 |
| 5,242,207 A | | 9/1993 | Carson et al. |
| 5,426,897 A | * | 6/1995 | Gazaway ................. 52/204.53 |
| 5,553,422 A | * | 9/1996 | Gazaway ................. 52/204.53 |
| 5,713,167 A | | 2/1998 | Durham et al. |
| D393,083 S | | 3/1998 | Caltrider |
| 5,992,107 A | | 11/1999 | Poirier |
| 6,047,500 A | | 4/2000 | Caplette |
| 6,082,062 A | * | 7/2000 | Alflen ........................ 52/202 |
| 6,216,401 B1 | | 4/2001 | Emek |
| 6,367,210 B1 | * | 4/2002 | Trundle ..................... 52/204.5 |
| 6,502,356 B2 | | 1/2003 | Emek |
| 6,725,620 B2 | * | 4/2004 | Dai ......................... 52/717.01 |
| 6,832,457 B2 | | 12/2004 | Geiger |
| 6,912,817 B1 | | 7/2005 | Sabac et al. |
| 2004/0020143 A1 | * | 2/2004 | Webb ..................... 52/204.53 |

* cited by examiner

*Primary Examiner*—Richard E Chilcot, Jr.
*Assistant Examiner*—Ryan D Kwiecinski
(74) *Attorney, Agent, or Firm*—McHale & Slavin, P.A.

(57) ABSTRACT

The invention generally relates to an apparatus for securing a piece of glass that has been covered substantially on one face with a window film within a frame by utilizing plurality of extruded window bolsters to secure the film to the frame without frame modification or alteration.

13 Claims, 4 Drawing Sheets

APPARATUS FOR SECURING AN IMPACT RESISTANT WINDOW TO A WINDOW FRAME

RELATED APPLICATIONS

This application is a continuation-in-part of applicants' U.S. application Ser. No. 09/457,631 filed Dec. 8, 1999, now U.S. Pat. No. 6,912,631, the contents of which are hereby incorporated by reference.

FIELD OF THE INVENTION

The invention generally relates to an apparatus for securing a piece of glass, that has been covered substantially on one face with a window film, within a frame by utilizing a plurality of extruded window bolsters to secure the film to the frame without frame modification or alteration.

DESCRIPTION OF THE PRIOR ART

Break and entry crimes are a well documented and, apparently, daily occurrence in many, if not all, cities. Break and entry into commercial retail establishments is a particularly vexing problem in that, on the one hand, it is desirable for the retail establishment to have large attractive displays of their wares behind panoramic glass windows so as to advertise and promote the establishment's wares; and on the other hand, such large windows and their associated displays of wares provide an enticing target for the criminal element who count on being able to break the glass from the outside and grab the wares on display through the open window frame.

In the prior art it is common, especially in high crime areas, for commercial retail outlets to have metal bars permanently installed either in front of or behind the glass storefront displays. The metal bars detract from the attractiveness of the window displays and often preclude customers from entering the store. Alternatively, windows are adapted to include pull down shutters or grates so as to lock an obstacle into place between the glass windows and a person attempting to break and enter. Both of these prior art solutions are not only unsightly, but expensive to install and maintain.

For many years, polyester laminates, ie. "window films" have been applied to windows for many purposes including solar and UV rejection, as well as increased safety and security. Certain thicker window films, deemed security films, have gradually been developed to contain sufficient tensile strength to hold the glass, glass particles, or a great number of the particles together in the event of breakage.

Security film is typically a thin, transparent, polymer film providing a resilient high tensile strength barrier which, when adhered against an interior surface of a glass window, resists complete shattering of the glass when an attempt at penetration is made from the outside. One commercial supplier of security window film is Metallized Products in St. Petersburg, Fla., U.S.A., who supply 12 mil and 14 mil cross weaved polyester film under the trademark SUN-GARD®. Another supplier of security window film is 3M® who markets safety and security film under the trademark SCOTCHSHIELD®. SCOTCHSHIELD® is held out by 3M® as resisting penetration by keeping the glass in place during attempted break-ins, storms and earthquakes.

However, it is the applicant's experience that merely applying security window film is not always sufficient to prohibit break and enter. In particular, it is quite often the case that a glass window, whether it has security film applied or whether it has embedded wire mesh or the like, will not prevent a break and enter at the hands of a determined assailant because the edges of the glass window are typically not secured to the window frame. Consequently, to affect a break and enter, the glass window, held together by its embedded wire mesh or security window film applied to an inner surface, merely has to be broken and bowed sufficiently to draw the edges of the glass free of the window frame, at which point the entire window may be pushed free of the frame.

There have been several attempts in the prior art to overcome this problem however, the known systems either require window frame modifications or they require the rubber seal to be modified or removed. Either of these modifications cause the original window manufacturer to void their warranty.

For example, U.S. Pat. No. 5,992,107 discloses an apparatus for edge mounting security window film in a window frame. The system includes a plurality of elongated sheet metal transfer members which are placed around the perimeter of the window. The sheet metal members include strips of two sided tape for securing the transfer members to the film and the window frame respectively.

U.S. Pat. Nos. 5,426,897 and 5,553,422 disclose glass restraint systems for windows. These systems extend the edge of security window film beyond the edge of the glass so as to overlap a significant portion of the window frame with security window film. Rigid base plates then overlay the overlapping area. The rigid base plates are screwed into the window frame so as to sandwich the edges of the window security film between the rigid base plate and the window frame. In this fashion, when bowing of the broken glass tensions the film, the tension is resisted by the mechanical mounting of the edges of the window security film to the window frame. In general, the system is typically employed to bend the edges of the security window film at 90 degrees to the plane of the window so that the mechanical mounting of the film to the window frame by means of screws through the rigid base plate is assisted by bending of the film around an edge of the plate adjacent the window.

U.S. Pat. No. 6,047,500 discloses a mounting bracket and window shield assembly for protecting a window of the type found on a subway or bus. The assembly includes a shield made of a flexible sheet of plastic. The shield is held in place by a mounting bracket which mounts directly to the existing window and window frame on the four sides of the window. The mounting bracket has a T-shaped cross section in which a first arm of the T forms a tab that is inserted between the existing window and window frame. The second arm of the T and the body of the T together form a seat upon which the window shield is placed. The window shield is held in place against the seat of the mounting bracket by a length of an elastomeric retaining seal. The retaining seal includes a bead which permits the retaining seal to be removably anchored to a channel formed by the body of the mounting bracket.

U.S. Pat. No. 5,242,207 discloses anti-vandalism sheets for the interior of public transportation vehicle windows. The system includes flexible protective sheets of acrylic and selected brackets for securing the sheet to the interior of a motor vehicle window. A plurality of fixed brackets are positioned about three of the four edges of the window, having one portion connected to a window frame housing of the motor vehicle window and a second portion sufficiently distanced from the surface of the window to accommodate the thickness of the sheet for securing the sheet adjacent the windows. A selectively removable retaining bracket is positioned on the edge of the window unoccupied by the fixed brackets.

U.S. Pat. No. 6,832,457 discloses a vehicle window assembly. The apparatus includes a protective transparent plastic window liner covering the inner side of the glass pane and held removably in place by flexible liner-retaining strips having quarter-round molding portions overlying the margins of the liner and anchor portions that are releasably secured in mounting grooves along the edge portions of the window pane. The anchor portions are integral with the molding portions and are pressed into the grooves past detent ribs that lock the strips releasably in place to secure the window liner against easy removal by a passenger, but permitting removal by service personnel for replacement. The mounting grooves are in elongated window-retaining bars that are positioned against the inner side of the pane and also are removably secured in place for ease of reglazing, having enlarged deformable anchors pressed into locking grooves with restricted open sides forming releasable tongue-and-groove connections for removal by tilting of the bars. An alternative embodiment combines the liner-retaining strip with the window-retaining strip joined by an integral hinge, with a locking strip for holding the molding strip against the window liner.

U.S. Pat. No. 4,121,394 discloses a pane having a flowable, moisture-resistant adhesive on its inner marginal edge portions. The pane is positioned on an existing glazed unit mounted in a fenestration. An elongated member having a grooved form therein is mounted to the fenestration walls or framing with the groove facing the outer marginal edge portions of the pane. Thereafter, a resilient glazing strip is urged into the groove to bias the pane toward the existing glazing, to flow the adhesive, to effect a hermetic seal between the pane and the glazed unit, and to provide an acceptable closure between the applied elongated member and the installed pane.

It is also known in the prior art to construct specialized window frames for absorbing shock while attaching the window film to the window frame. Such prior art constructions are generally complicated and expensive in nature, requiring the existing window and frame to be replaced with the impact resistant window and frame.

For example, U.S. Pat. Nos. 6,216,401 and 6,502,356 disclose a profiled window sash section for holding a window pane, which is intended for being installed in an outer frame of a blast resistant window. The sash section includes a main member enabling inter-engagement between the profiled sash member and the outer frame, a window pane holding member for accommodating and securing an end portion of the window pane in the profiled sash member, and a reinforcing member designed to support the end portion of the window pane and to transmit blast pressure. The sash section is provided with damping means for deforming up to a predetermined limit. Also described is a blast-resistant framework for a casement window, including the window sash assembled from the mentioned profiled sash sections and adapted for rigidly and air-tightly securing the window pane in the holders of the profiled sash members.

Therefore what is needed in the art is a method and apparatus for converting pre-existing windows and window frames into impact resistant windows and frames. The method and apparatus should be compatible with a large variety of pre-existing windows and frames. The method and apparatus should adapt the window and frame into an impact resistant frame without requiring alterations to the frame that would void a manufacturers warranty. The method and apparatus should adapt the pre-existing window and frame into an impact resistant frame without requiring the removal or alteration of window seals. The method and apparatus should adapt the window and frame into an impact resistant frame without requiring holes to be drilled or punched into the frame. The method and apparatus should allow damaged glass to be replaced without destruction of either the window frame or the window restraining apparatus.

SUMMARY OF THE INVENTION

Therefore, it is an objective of the present invention to teach an apparatus for converting a pre-existing window and frame into an impact resistant window.

Another objective of the instant invention is to teach an apparatus for securing a window covered with security film to a window frame so as to offer resistance to bowing of the glass once broken.

Yet another objective of the instant invention is to teach an extruded metal bolster for securing a film covered window to a pre-existing window frame without requiring modification of the window frame or removal of any seals.

Still another objective of the instant invention is to teach a method of converting a pre-existing non-impact resistant window and frame into an impact resistant window and frame.

Still yet another objective of the instant invention is to teach a method of securing a glass window having one surface covered with a layer of impact resistant film to a window frame without requiring modification to the frame.

Generally, a preferred embodiment of the present invention includes an impact resistant panel, and a plurality of window bolsters to adhere the impact resistant panel to the pre-existing window frame without modification or alteration to the frame or window seals. For example, a typical window frame is constructed to include a channel extending around the inner perimeter of the frame. At least one seal or gasket extends around the channel on either side of the glass to locate and seal the window into place.

To create the impact resistant panel, the existing glass is coated with the window film utilizing normal window film installation techniques. The film is applied to the glass with a water solution, squeegeed in place, and excess film is trimmed off at the point where the glass meets the existing window frame or mullion. Extruded window bolsters are trimmed to fit around the inner perimeter of the frame. The window bolster is extruded so that it is smooth on the visible exterior surfaces. The interior of the bolsters are extruded to include a first adhesive channel which extends along the front surface of the bolster for securing the bolster to the film covered window, and a second adhesive channel which extends along the lower surface of the bolster for securing the bolster to the window frame. Structural adhesive is applied along the channels, and the adhesive treated bolster is pushed into place creating a double adhesive binder along the edge of the film as well as the inner surface of the existing window frame. A plurality of air conduits are extruded within the interior of the bolsters to allow air to circulate through the bolsters to cure the adhesive. The bolster acts as a structural bridge that spans the normal window seal and/or gasket so that the bolsters may secure the impact resistant window to the frame without modification to the frame or removal of any gaskets and/or seals. The smooth exterior of the bolster provides an aesthetically pleasing appearance and hides the adhesive. The adhesive channels may be positioned within the bolster to maintain a predetermined thickness of a resilient adhesive. The thickness of resilient adhesive allows the bolster to absorb impact shock without fracturing the adhesive or breaking its' bonds to the frame or window.

An advantage of the present invention is that it provides a secure means of attaching an impact resistant panel to an existing frame in an aesthetically pleasing manner. Installation of the bolsters requires less cumbersome and complicated means, including less labor and materials than those systems previously offered. The construction and installation of the bolsters eliminate frame modifications such as drilling and screwing the system in place, as well as any seal or gasket modifications.

A further advantage of the present invention is the cutting of the film along the existing window frame edge (how window film is normally installed) instead of overlapping it, thereby creating a drastic ease of installation over previous systems. The use of commonplace window film application techniques dramatically cuts installation time by, first, not having to pre-cut the material larger than the glass, (an extremely time consuming process as film must be meticulously cut so that it is square and will form an exact fit into the existing window frame.) Secondly, cutting along the edge eliminates the actual overlapping or bending of the film, also a time consuming process as the film must be pre-bent and pushed into the frame. Third, the use of common place film application techniques also allows for greater utilization of the current skilled labor pool.

In addition, cutting the film along the edge instead of overlapping allows for a dramatically improved ability to utilize thicker window film laminates with higher tensile strengths that previously would have been nearly impossible to overlap. For example, the thicker the film the more memory it retains when bent. This causes difficulty in keeping the overlapped film in place before it cures to the glass and frame. Cutting the film along the edge eliminates this problem. These higher tensile strength films allow the system as a whole to perform better, achieving greater impact and cyclical resistance and improved water penetration resistance.

Furthermore, the present invention allows for the use of different bolster configurations which can dramatically improve the performance of the restraint system and allow for multiple uses of the impact resistant system. For example, configuring the design of the bolster to remain rigid during panel impact allows the system to withstand repetitive wind load cycles, such as with long duration hurricane force winds. On the other hand, a bolster designed to be more conducive to flex would allow the bolster body to act as a shock absorber or crumple zone to help dissipate a major instantaneous force, such as with a bomb blast load. Varying the configuration and thickness of the bolster's impact absorption arm allows the bolster to slow the impact load at different rates to help control and distribute the load.

DETAILED DESCRIPTION

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
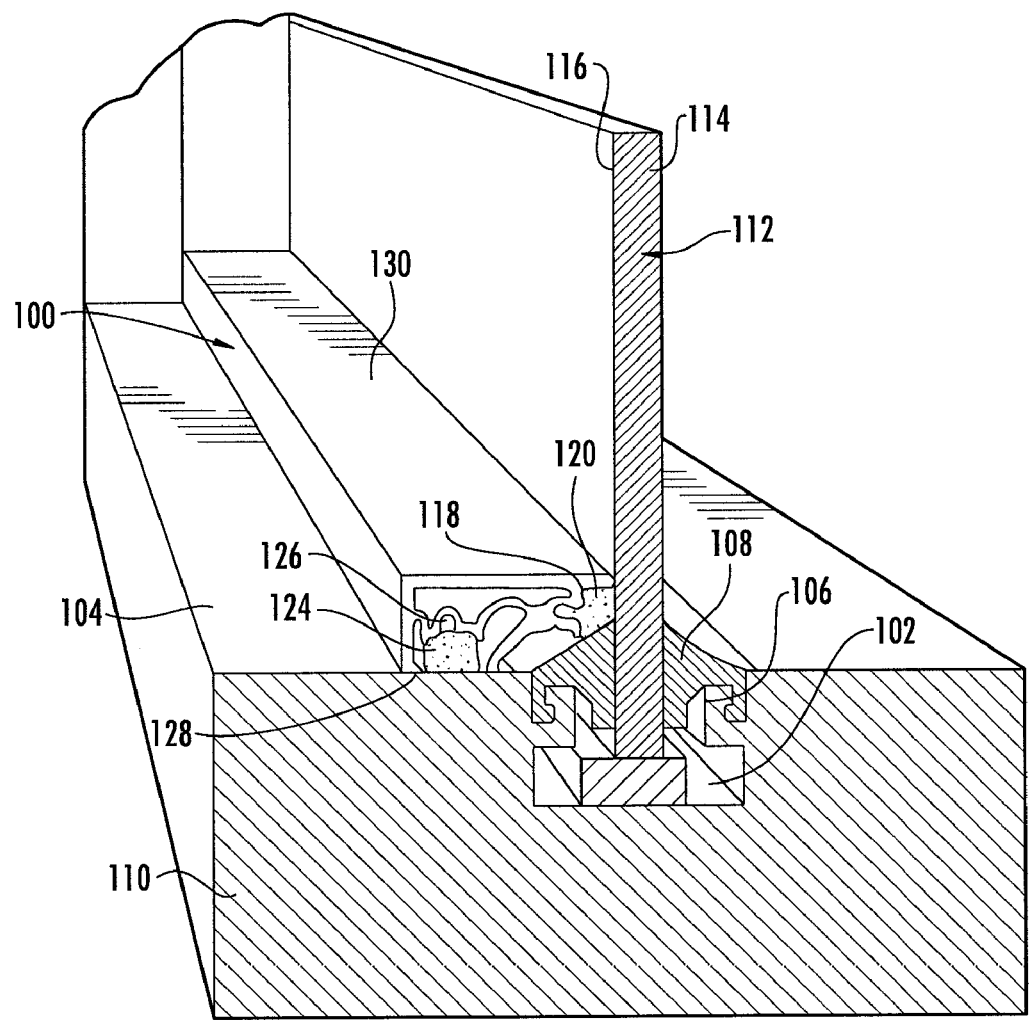
FIG. 1 is a perspective cross sectional view of one embodiment of the instant invention illustrated in cooperation with a window frame and an impact resistant window.
Figure 2:
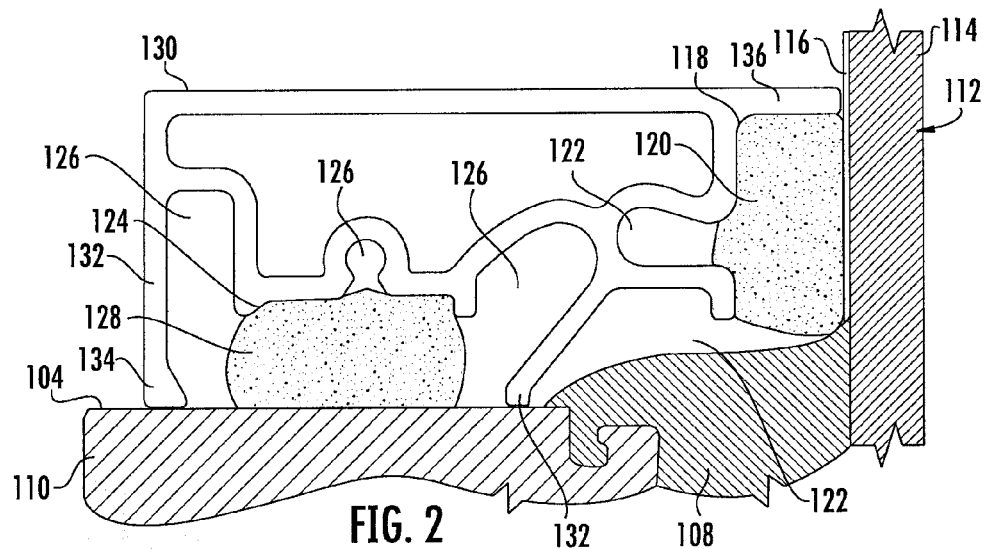
FIG. 2 is a partial cross section of the embodiment illustrated in FIG. 1.
Figure 3:
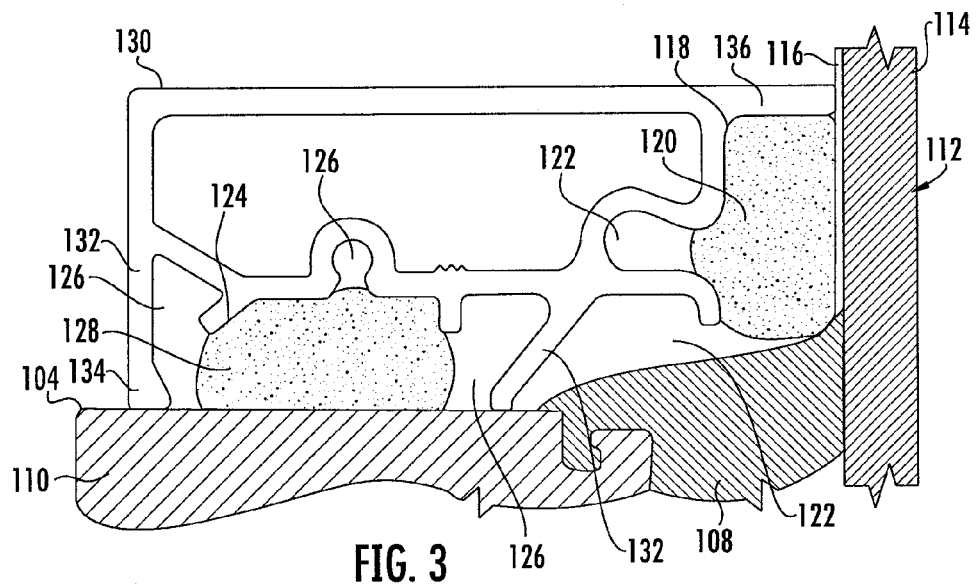
FIG. 3 is a partial cross sectional view of an alternative embodiment of the instant invention.
Figure 4:
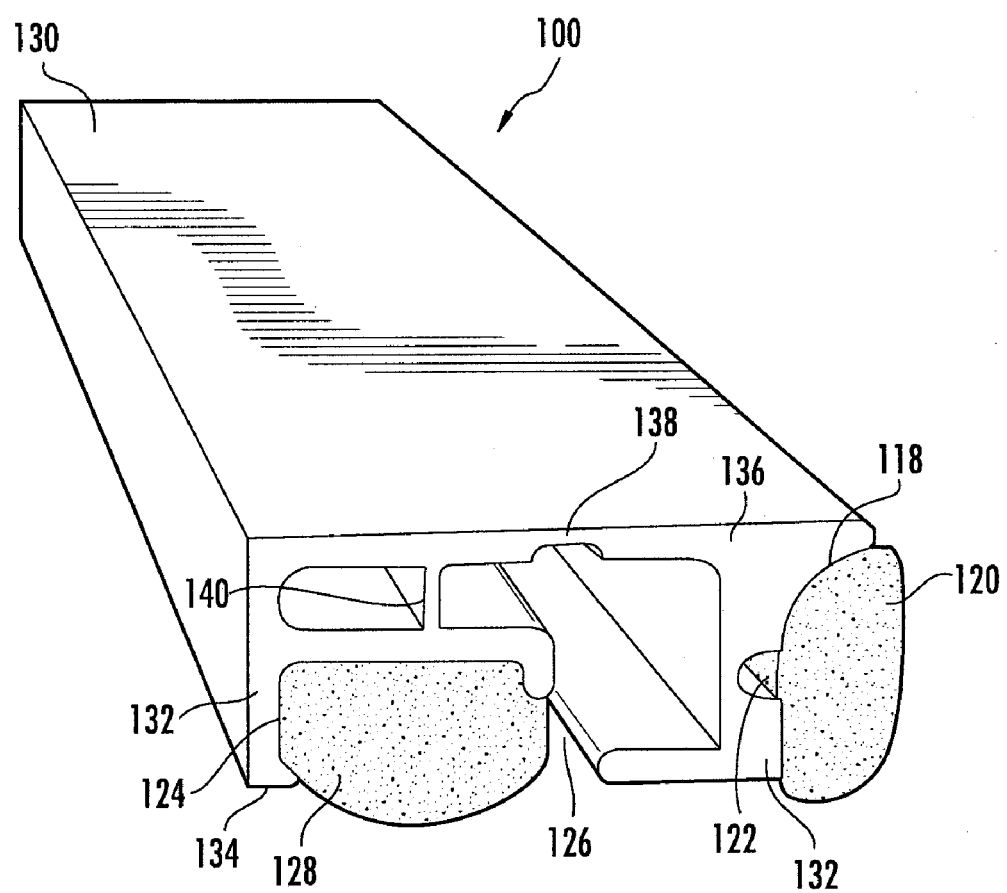
FIG. 4 is a perspective view of an alternative embodiment of the instant invention.

Referring to FIG. 1, the preferred embodiment of the instant invention window bolster 100 is illustrated in secured cooperation with an impact resistant window 112 and a frame 110. Windows 114 are generally fit into an opening in a wall or roof to let light or air in and allow people to see out. They are available in numerous sizes and shapes, and may be constructed of various polymeric and/or glass materials. The perimeter of the window is generally surrounded by a frame which may also be constructed of various materials well known in the art suitable for retaining and sealing a window within an opening. The frame 110 typically includes a substantially U-shaped groove 102 extending around an inner perimeter 104 of the frame for positioning the window within the frame. Each leg 106 of the U-shaped groove typically includes at least one elastomeric member 108 positioned to cooperate with the window for sealing and positioning the window within the frame. Glass and/or polymeric windows are often converted to impact resistant panels by applying a layer of security film 116 to one side of the window 114 as is well known in the art.

Referring to FIGS. 1-4, one or more window bolsters 100 having a total length substantially equal to the inner perimeter 104 of the frame 110 are illustrated secured to the window frame and the impact resistant window 112. The window bolsters 100 each include an integrally formed first adhesive channel 124. The first adhesive channel is constructed and arranged to control flow of a first bead of adhesive 128 for securement of the bolster 100 to the frame 110. The first adhesive channel 124 preferably includes at least one air conduit 126 extending the length of the bolster for allowing air to flow to the first bead of adhesive for curing the first bead of adhesive after assembly. The construction of the first adhesive channel directs the adhesive downward during push in application of the bolster 100.

The window bolster also includes a second adhesive channel 118. The second adhesive channel is constructed and arranged to control flow of a second bead of adhesive 120 for securing the bolster 100 to the impact resistant window 112. The second adhesive channel 118 preferably includes at least one air conduit 122 extending the length of the bolster 100 for allowing air to flow to the second bead of adhesive 120 for curing the second bead of adhesive after assembly. The construction of the second adhesive channel directs the adhesive downward during push in application of the bolster 100 and also prevents the second bead of adhesive 120 from extending beyond the top surface 130 of the bolster for an aesthetically appealing appearance.

The preferred embodiment of the bolster includes a pair of integrally formed support legs 132 which are constructed and arranged to cooperate with the first adhesive channel 124 to maintain a predetermined thickness of adhesive 128 between the adhesive channel and the frame 110. In a most preferred embodiment at least one of the support legs includes an integrally formed foot 134. The foot has an increased cross section with respect to the pair of support legs 132 for dispensing loads exerted on the bolster across an increased area of the frame. In this manner, an adhesive having elastomeric properties, well known in the art, may deform a predetermined amount to absorb impacts applied to the bolster. In a most preferred embodiment the support legs maintain about 3/16 of an inch of adhesive thickness during installation. It should also be noted that the adhesive thickness may be maintained thicker or thinner by varying the length of the legs or the respective position of the adhesive channels within the bolster to achieve different shock absorbing properties within the assembly.

The bolster also includes an integrally formed impact absorber arm 136. The impact absorber arm is constructed and arranged to maintain a predetermined thickness of the adhesive between the second adhesive channel and the impact resistant window. The thickness and/or shape of the impact absorber arm may be varied to dissipate loads exerted on the bolster from the impact resistant window. This area is crucial during impact shock loading as in the case of bomb blasts. In alternative embodiments the impact absorber arm 136 may include crumple zones 138 or frangible connecting links 140, which are constructed and arranged to redirect and dissipate shock loads. The crumple zones and frangible connecting links are preferably integrally extruded to the bolster and extend the entire length thereof. This shock absorbing characteristic of the impact absorber arm allows for less of the load to be transferred to the second bead of structural adhesive 120, allowing for better securement of the impact resistant window 112 to the bolster 100.

Figure 5:
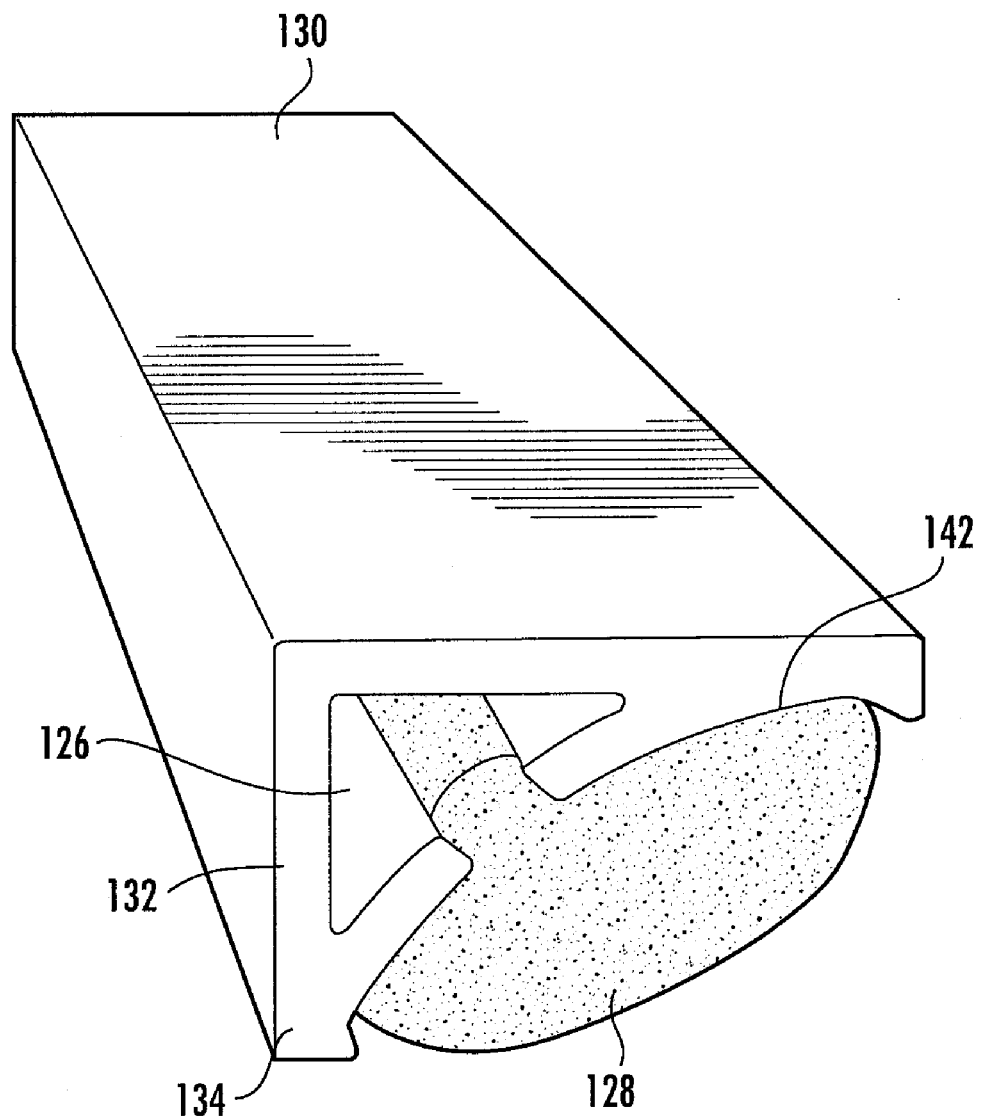
FIG. 5 is a perspective view of an alternative embodiment of the instant invention.

Referring to FIG. 5, an alternative embodiment of the instant invention is illustrated. In this embodiment the bolster 100 includes a single adhesive channel 142 having sufficient width to extend from the impact resistant channel to the frame. In this manner the first bead of adhesive 128 secures the bolster 100 to the impact resistant panel, the rubber seal 108 (FIG. 1), and the frame 110.

A number of embodiments of the present invention have been described. Nevertheless, it will be understood that various modifications may be made without departing from the spirit and scope of the invention. Accordingly, it is to be understood that the invention is not to be limited by the specific illustrated embodiment but only by the scope of the appended claims.

What is claimed is:

1. The apparatus for retaining an impact resistant window within a frame, said impact resistant window includes a window pane and a film adhesively secured to said window pane, said frame includes a substantially U-shaped groove having a plurality of legs and extending around an inner perimeter of said frame for positioning said impact resistant window within said frame, each said leg of said U-shaped groove included at least one elastomeric member positioned therein and cooperating with said impact resistant window sealing said impact resistant window within said frame;
   said film extends along a surface of said window pane but does not extend over said at least one elastomeric member;
   one or more window bolsters having a total length substantially equal to said inner perimeter of said frame, said one or more window bolsters being separate and distinct from said at least one elastomeric member, said window bolsters including a first bead of adhesive, said first bead of adhesive providing securement of said bolster to said frame, said bolster including a second bead of adhesive, said second bead of adhesive bonding said impact resistant window to said one of more of said window bolsters,
   said impact resistant window is structurally bonded to said one or more of said window bolsters and said one or more of said window bolsters are structurally bonded to said frame;
   said one or more window bolsters each include an integrally formed first adhesive channel, said first adhesive channel is constructed and arranged to control flow of said first bead of adhesive providing securement of said bolster to said frame;
   said first adhesive channel includes at least one air conduit allowing air to flow to said first bead of adhesive curing said first bead of adhesive, said at least one air conduit extends the length of said one or more bolsters;
   said one or more window bolsters each include an integrally formed second adhesive channel, wherein said second adhesive channel is constructed and arranged to control flow of said second bead of adhesive for securement of said bolster to said frame; and
   said second adhesive channel includes at least one air conduit allowing air to flow to said second bead of adhesive curing said second bead of adhesive, said at least one air conduit extends the length of said one or more bolsters.

2. The apparatus for retaining an impact resistant window within a frame as cited in claim 1 wherein said bolster includes at least one integrally formed support leg, wherein said at least one support leg is constructed and arranged to cooperate with a first adhesive channel to maintain a predetermined thickness of said adhesive between said first adhesive channel and said frame.

3. The apparatus for retaining an impact resistant window within a frame as cited in claim 2 wherein said bolster includes a pair of integrally formed support legs, wherein said pair of support legs are constructed and arranged to cooperate with said first adhesive channel to maintain a predetermined thickness of said adhesive between said first adhesive channel and said frame.

4. The apparatus for retaining an impact resistant window within a frame as cited in claim 3 wherein at least one of said support legs include an integrally formed foot, wherein said foot has an increased cross section with respect to said pair of support legs, wherein said foot is constructed and arranged to disperse loads exerted on said bolster across an increased area of said frame.

5. The apparatus for retaining an impact resistant window within a frame as cited in claim 2 wherein said adhesive includes elastomeric properties for absorbing impact delivered to said bolster.

6. The apparatus for retaining an impact resistant window within a frame as cited in claim 1 wherein said bolster includes an integrally formed impact absorber arm, wherein said impact absorber arm is constructed and arranged to maintain a predetermined thickness of said adhesive between a second adhesive channel and said impact resistant window.

7. The apparatus for retaining an impact resistant window within a frame as cited in claim 6 wherein said adhesive is about three sixteenths of an inch thick.

8. The apparatus for retaining an impact resistant window within a frame as cited in claim 6 wherein said adhesive includes elastomeric properties for absorbing impact delivered to said bolster.

9. The apparatus for retaining an impact resistant window within a frame as cited in claim 1 wherein said bolster includes an integrally formed impact absorber arm, wherein said impact absorber arm is constructed and arranged to dissipate loads exerted on said bolster from said impact resistant window.

10. The apparatus for retaining an impact resistant window within a frame as cited in claim 1 wherein said bolster includes at least one crumple zone, wherein said crumple zone is constructed and arranged to dissipate and redirect impact loads encountered by said impact resistant window.

11. The apparatus for retaining an impact resistant window within a frame as cited in claim 10 wherein said at least one crumple zone is an integrally formed thin section.

12. The apparatus for retaining an impact resistant window within a frame as cited in claim 1 wherein said bolster includes at least one frangible connecting link, wherein said at least one frangible connecting link is constructed and arranged to dissipate and redirect impact loads encountered by said impact resistant window.

13. The apparatus for retaining an impact resistant window within a frame as cited in claim 12 wherein said at least one frangible connecting link is an integrally formed thin section which connects an impact absorber arm and said first adhesive channel.

* * * * *